(12) United States Patent
Paruchuri

(10) Patent No.: US 11,706,216 B2
(45) Date of Patent: *Jul. 18, 2023

(54) APPLICATION-BASED NETWORK SECURITY

(71) Applicant: Juniper Networks, Inc., Sunnyvale, CA (US)

(72) Inventor: Vijay Sai Ram Paruchuri, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/581,125

(22) Filed: Jan. 21, 2022

(65) Prior Publication Data
US 2022/0150246 A1    May 12, 2022

Related U.S. Application Data

(63) Continuation of application No. 16/699,294, filed on Nov. 29, 2019, now Pat. No. 11,245,697.

(51) Int. Cl.
*H04L 9/40* (2022.01)
*H04L 45/00* (2022.01)

(52) U.S. Cl.
CPC .......... *H04L 63/0876* (2013.01); *H04L 45/38* (2013.01); *H04L 63/0485* (2013.01); *H04L 63/164* (2013.01)

(58) Field of Classification Search
CPC ............. H04L 63/0876; H04L 63/0485; H04L 63/164; H04L 45/38

(Continued)

(56) References Cited

U.S. PATENT DOCUMENTS 6,092,113 A    7/2000    Maeshima et al.
6,141,686 A *  10/2000   Jackowski ............ H04L 69/165
                                                    709/224

(Continued)

FOREIGN PATENT DOCUMENTS

CN    101156420 A    4/2008

OTHER PUBLICATIONS

Extended European Search Report for Application No. EP20154488.9, dated Aug. 17, 2020, 9 pages.

(Continued)

*Primary Examiner* — Michael S McNally
(74) *Attorney, Agent, or Firm* — Harrity & Harrity, LLP

(57) ABSTRACT

A network device may receive, from an application on a user device, a first network packet associated with a packet flow. The network device may identify an application identifier of the first network packet, wherein the application identifier identifies the application on the user device. The network device may select, based on the application identifier, a security protocol, wherein the security protocol is associated with at least one of an authentication header (AH) or an encryption algorithm. The network device may selectively apply, to a second network packet associated with the packet flow, at least one of the AH or the encryption algorithm, associated with the security protocol, to generate a protected network packet. The network device may transmit the protected network packet.

20 Claims, 9 Drawing Sheets

(58) Field of Classification Search
USPC .............................................................. 726/6
See application file for complete search history.

(56) References Cited

U.S. PATENT DOCUMENTS

| | | |
|---|---|---|
| 7,656,795 B2 | 2/2010 | Jakubik et al. |
| 8,316,226 B1 | 11/2012 | Kshirsagar et al. |
| 8,509,071 B1 | 8/2013 | Narayanaswamy |
| 9,912,699 B1 | 3/2018 | Hebbar et al. |
| 11,245,697 B2 | 2/2022 | Paruchuri |
| 2006/0039335 A1 | 2/2006 | Ono et al. |
| 2014/0169192 A1* | 6/2014 | Zhang ................... H04W 24/08 370/252 |
| 2015/0350071 A1 | 12/2015 | Pauly et al. |
| 2016/0110297 A1 | 4/2016 | Sharma et al. |
| 2016/0315920 A1 | 10/2016 | Kurmala et al. |
| 2017/0134087 A1* | 5/2017 | Law ................... H04B 7/18508 |

OTHER PUBLICATIONS

Huttunen., et al., "UDP Encapsulation of IPsec ESP Packets, rfc3948.txt", Network Working Group, RFC3948, Jan. 2005, pp. 1-16.

\* cited by examiner

APPLICATION-BASED NETWORK SECURITY

RELATED APPLICATION

This application is a continuation of U.S. patent application Ser. No. 16/699,294, filed Nov. 29, 2019 (now U.S. Pat. No. 11,245,697), which is incorporated herein by reference in its entirety.

BACKGROUND

Network devices, such as routers, switches, or the like, may handle data in the form of network packets (e.g., data packets). In some cases, network devices may transmit the network packets using a network. In some cases, network devices may perform other actions on network packets, such as encryption, decryption, load balancing, security scanning, or the like.

SUMMARY

According to some implementations, a method may include receiving, by a network device and from an application on a user device, a first network packet associated with a packet flow; identifying, by the network device, an application identifier of the first network packet, wherein the application identifier identifies the application on the user device; selecting, by the network device and based on the application identifier, a security protocol, wherein the security protocol is associated with at least one of an authentication header (AH) or an encryption algorithm; selectively applying, by the network device and to a second network packet associated with the packet flow, at least one of the AH or the encryption algorithm, associated with the security protocol, to generate a protected network packet; and transmitting, by the network device, the protected network packet.

According to some implementations, a device may include one or more memories; and one or more processors to: receive, from an application on a user device, a first network packet; apply a first security protocol to the first network packet to generate a first protected network packet, wherein the first security protocol is associated with applying a first authentication header (AH) and/or a first encryption algorithm; identify an application identifier associated with the first network packet, wherein the application identifier identifies the application on the user device; select, based on the application identifier, a second security protocol, wherein the second security protocol is associated with applying a second AH and/or a second encryption algorithm; transmit the first protected network packet; receive, from the application on the user device, a second network packet; apply the second security protocol to the second network packet to generate a second protected network packet; and transmit the second protected network packet.

According to some implementations, a non-transitory computer-readable medium may store one or more instructions. The one or more instructions, when executed by one or more processors, may cause the one or more processors to: receive, from an application on a user device, a first network packet associated with a packet flow, wherein the first network packet has a first internet protocol (IP) header; identify an application identifier of the first network packet, wherein the application identifier identifies the application on the user device; select, based on the application identifier, a security protocol; apply, to a second network packet associated with the packet flow, the security protocol to generate a protected network packet having a second IP header, wherein the second IP header is different from the first IP header; and transmit the protected network packet.

DETAILED DESCRIPTION

Figure 1A:
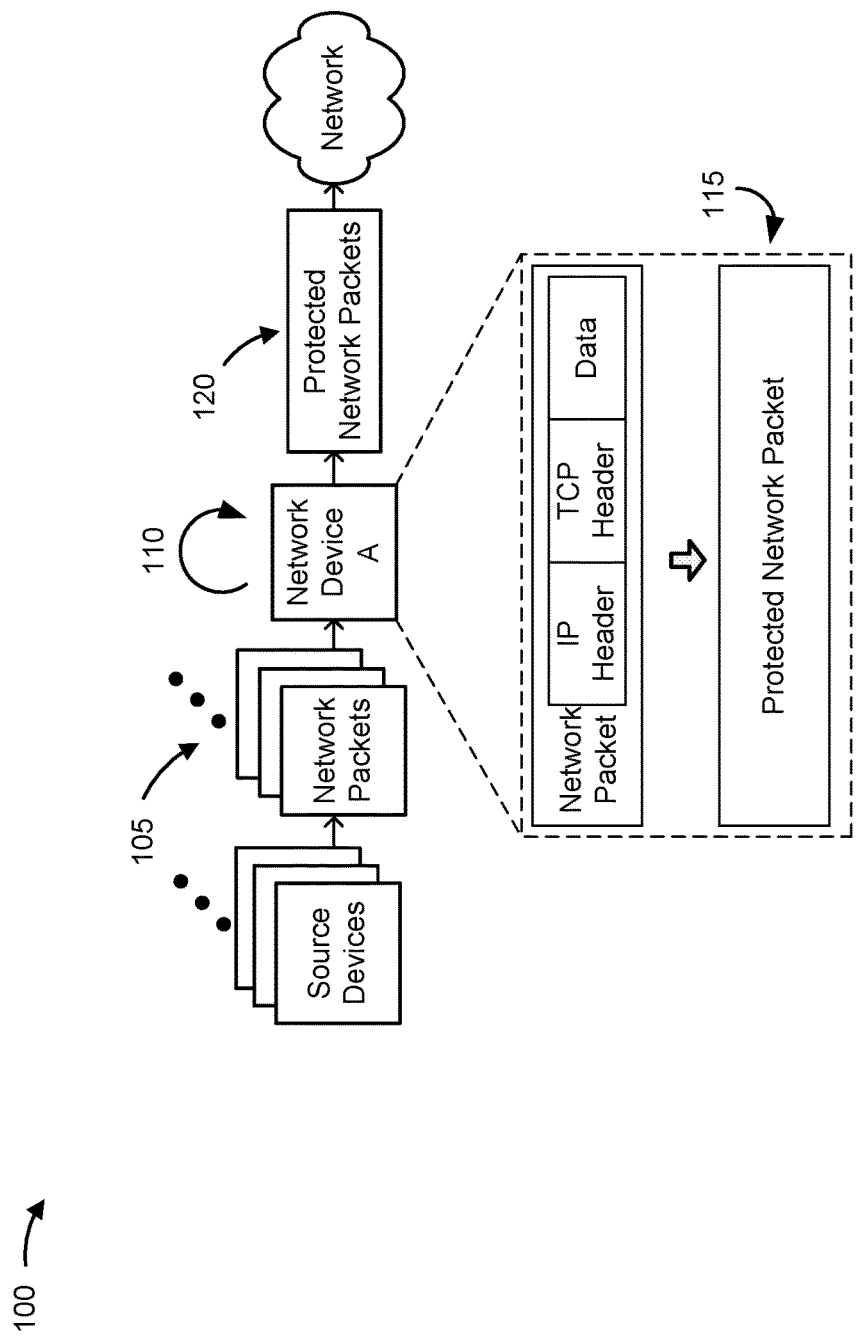
FIGS. 1A-1C are diagrams of one or more example implementations described herein.

The following detailed description of example implementations refers to the accompanying drawings. The same reference numbers in different drawings may identify the same or similar elements.

Network packets may be processed by network devices for a variety of reasons, such as to perform routing, encryption, decryption, load balancing, security processing, and/or the like. For example, a network device (e.g., implementing Internet Protocol Security (IPsec), a virtual private network (VPN), and/or the like) may apply security protocols to network packets to encrypt or otherwise secure the network packets for transmission in a manner designed to prevent the network packets from being intercepted by a malicious actor and/or to make the network packets unintelligible to those who do intercept the network packets. The network device may select security protocols to apply based on Layer 3 (L3) information (e.g., an IP header), Layer 4 (L4) information (e.g., a TCP header, a user datagram protocol (UDP) header, and/or the like), and/or differentiated services code point (DSCP) information for network packets. For example, the network device may select, based on the L3 information, L4 information, and/or DSCP information for a network packet, an authentication header (AH) and/or an encryption algorithm, and may apply the AH to the network packet and/or encrypt the network packet.

When an application on a device sends an encrypted network packet to the network device and the network device encrypts the encrypted network packet again based on the L3 information, L4 information, and/or DSCP information, the network device consumes computing resources by adding an extra layer of encryption to an already encrypted network packet. Additionally, a network device that receives the encrypted network packet consumes computing resources when the network device decrypts the extra layer of encryption on the encrypted network packet. Furthermore, depending on the application sending the network packet, encryption may not be necessary.

Some implementations described herein may include a network device that selects a security protocol (e.g., an AH, an encryption algorithm, and/or the like) for a network packet based on an application identifier for the network packet. For example, the network device may use deep packet inspection to identify an application identifier for an application that sent a network packet.

In some implementations, the network device may select, based on the application identifier, a security protocol. For example, the application identifier may identify a high priority application (e.g., a business critical and/or highly important application), and the network device may select, based on the application identifier, a security protocol that includes strong authentication and encryption. In another example, the application identifier may identify an application with inherent encryption, and the network device may select, based on the application identifier, a security protocol that includes authentication but not encryption.

In some implementations, the network device may select, based on the application identifier, an IPsec tunnel and add a new IP header to the network packet to route the network packet through the IPsec tunnel. For example, an application and/or a group of applications may have a dedicated IPsec tunnel, through which the network device may route network packets. By selecting a security protocol based on the application sending the network packet, the network device may conserve computing resources that would otherwise be consumed by selecting a security protocol based on the L3, L4, and/or DSCP information.

Figure 1B:
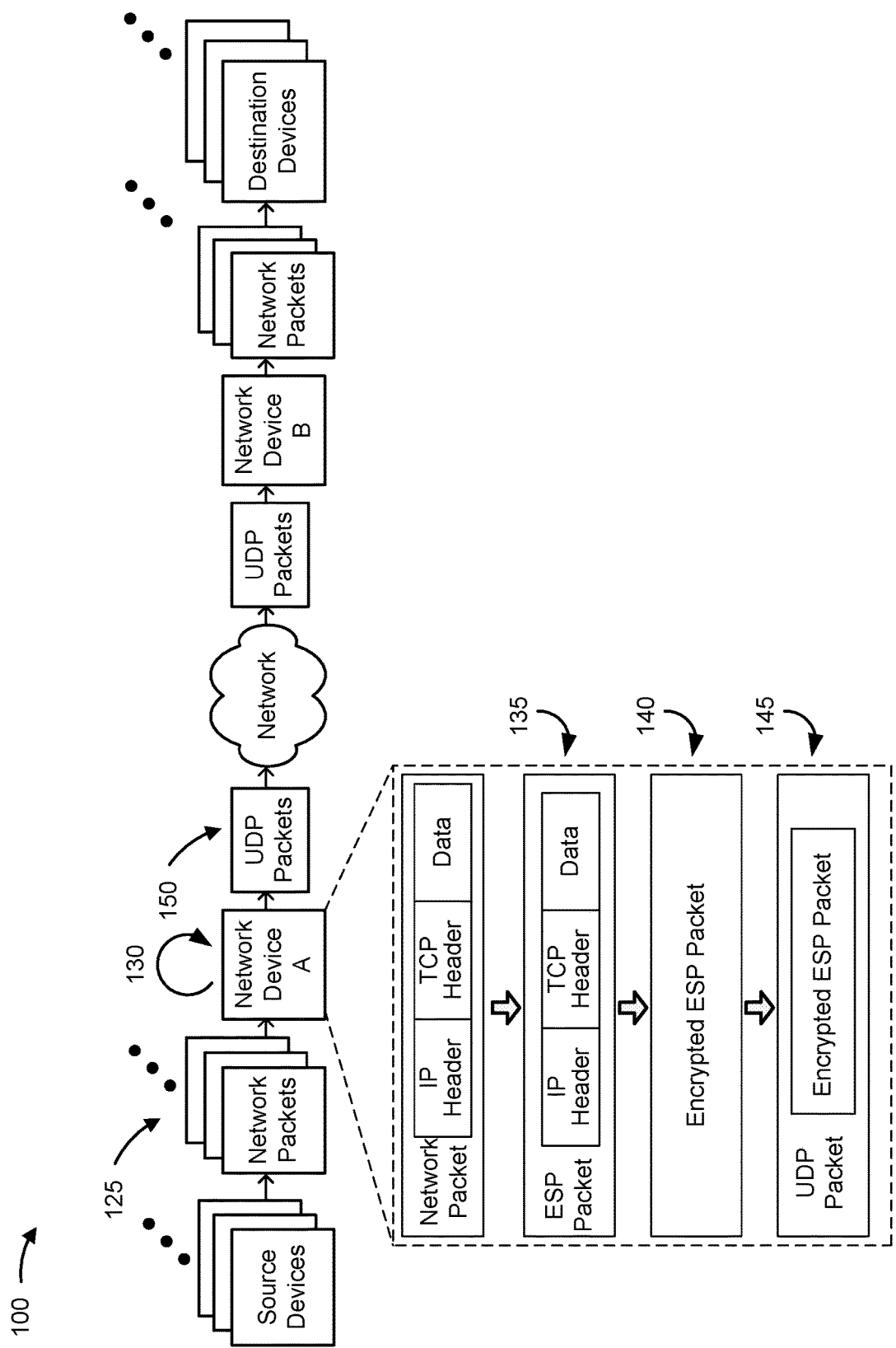
Figure 1C:
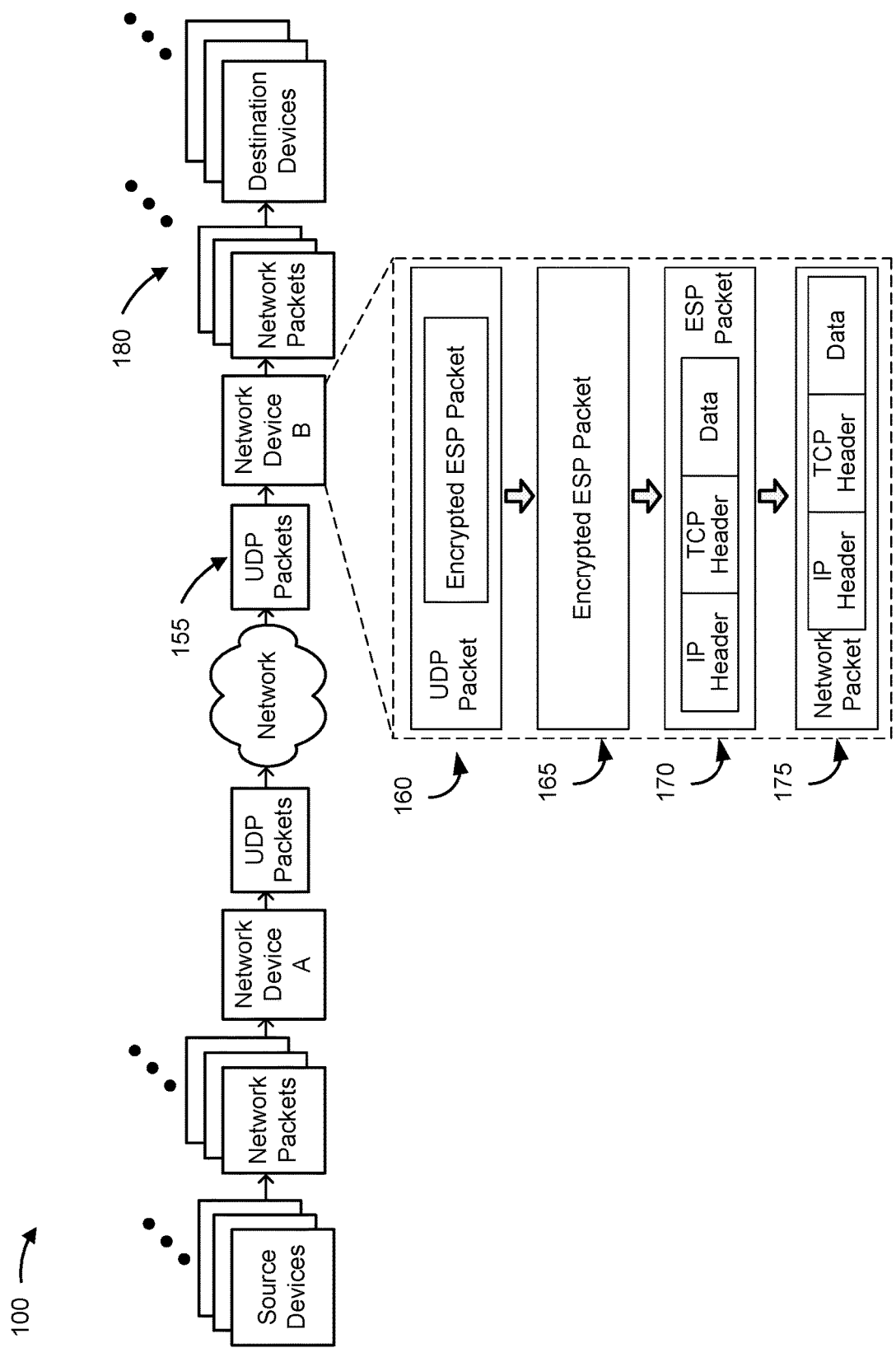

FIGS. 1A-1C are diagrams of one or more example implementations described herein. For example, as shown in FIGS. 1A-1C, example implementation(s) 100 may include source devices (e.g., home computers, mobile phones, server computers, and/or the like) which may provide, via a network, data in the form of network packets (e.g., internet protocol (IP) packets) to destination devices (e.g., home computers, mobile phones, server computers, and/or the like). Example implementation 100 may further include network devices (e.g., network device A and network device B, as shown) which may be responsible for forwarding network packets and performing one or more operations, such as encryption and/or the like. For example, network device A may forward network packets from the source devices to the network, and network device B may forward network packets from the network to the destination devices.

As shown in FIG. 1A, and by reference number 105, the source devices may provide multiple network packets, which may be associated with any kind of network traffic, to network device A (e.g., a customer premises device, an internet service provider (ISP) device, an edge device, a core device, and/or the like). In some implementations, an application on a source device may provide, to network device A, a packet flow including a plurality of network packets. For example, a network packet, of the plurality of network packets, may include an IP header, a transmission control protocol (TCP) header, and data. In some implementations, network device A may identify that the packet flow includes the plurality of network packets associated with the packet flow based on characteristics of the plurality of network packets of the packet flow, such as a common IP address for the source device, a common IP address of a destination of device, from among the destination devices, to which the application is sending the packet flow, a protocol being used for the plurality of network packets, a port identified by the plurality of network packets, and/or the like.

In some implementations, network device A may identify an application identifier of a network packet of the plurality of network packets. In some implementations, network device A may use deep packet inspection to identify the application identifier for the application that sent the network packet. For example, network device A may make a copy of the network packet and may use deep packet inspection to inspect one or more header fields (e.g., one or more fields of the IP header, the TCP header, and/or the like) and/or a payload field (e.g., the data of the network packet) of the network packet to identify the application identifier. Additionally, or alternatively, if network device A already has the application identifier for the network packet (e.g., because another network device previously used deep packet inspection to identify the application identifier for the packet flow, because the network device previously performed deep packet inspection on another network packet of the packet flow, and/or the like), network device A may identify the application identifier by accessing a local data structure (e.g., an application cache, a domain name system (DNS) cache, a database, a lookup table, and/or the like).

In some implementations, before network device A has identified the application identifier of the network packet as described herein, network device A may apply a particular AH (e.g., a default AH) and/or a particular encryption algorithm (e.g., a default encryption algorithm) to a first group of network packets of the packet flow to generate first protected network packets, and may transmit the first protected network packets.

In some implementations, the particular AH may protect the first group of network packets of the packet flow. For example, network device A, when applying the particular AH, may use a hash function and/or an authentication algorithm. In some implementations, network device A may use the hash function and/or the authentication algorithm to generate the particular AH for the first group of network packets of the packet flow. For example, network device A may insert the particular AH into the first group of network packets of the packet flow to generate the first protected network packets.

In some implementations, network device A may use the particular encryption algorithm to encrypt the first group of network packets of the packet flow. In some implementations, network device A may use the particular encryption algorithm to encrypt the one or more network packets of the packet flow and generate an encapsulating security payload (ESP) header, an ESP trailer, and/or an ESP authentication block for the first group of network packets of the packet flow. For example, network device A may use the particular encryption algorithm to encrypt the first group of network packets of the packet flow and insert the ESP header, the ESP trailer, and/or the ESP authentication block into the first group of network packets of the packet flow to generate the first protected network packets. In some implementations, the ESP header may include information identifying the encryption algorithm used to encrypt the IP header, the TCP header, the data, and/or the ESP trailer. In some implementations, the ESP trailer may include additional information identifying the encryption algorithm used to encrypt the IP header, the TCP header, the data, and/or the ESP trailer, information regarding a type of the data, and/or the like. In some implementations, the ESP authentication block may include an Integrity Check Value computed over the ESP header, the TCP header, the data, the ESP trailer, and/or the like.

In this way, network device A may maintain network traffic of the packet flow while attempting to identify the application identifier of the network packet and, by applying the particular AH and/or the particular encryption algorithm to the first group of network packets, network device A may protect the first group of network packets from malicious activities, such as replay attacks, unintended accessing of and/or tampering with the contents of the first group of network packets (e.g., the IP header, the TCP header, the data, and/or the like), spoofing, and/or the like, which conserves network resources that would otherwise be used to mitigate damage caused by the malicious activities in the network and/or device resources that would otherwise be used to mitigate damage caused by the malicious activities on a device, such as a source device or a destination device.

In some implementations, after network device A has identified the application identifier of the network packet (e.g., using deep packet inspection), network device A may select, based on the application identifier, a security protocol to be applied to one or more network packets of the plurality of network packets of the packet flow, as shown in FIG. 1A, and by reference number 110. In some implementations, the security protocol may include an AH and/or an encryption algorithm. In some implementations, network device A may select the security protocol based on the application identifier and one or more rules and/or policies (e.g., software-defined networking in a wide area network (SD-WAN) policies, security policies, and/or the like), where the one or more rules and/or policies identify AHs and/or encryption algorithms to be applied for a plurality of application identifiers that include the application identifier. For example, the one or more rules and/or policies may identify AHs and/or encryption algorithms to be applied for groups of application identifiers, and the groups may be based on characteristics of applications identified by the plurality of application identifiers. In some implementations, a characteristic, for an application, may include whether the application inherently uses encryption, a measure of priority for the application, a type of the application, and/or the like.

In some implementations, network device A, when selecting the security protocol, may select at least one of an AH or an encryption algorithm based on the application identifier and one or more characteristics of the application. For example, network device A, when selecting the security protocol, may select a security protocol that includes an AH and does not include an encryption algorithm based on the application identifier and one or more characteristics of the application (e.g., one or more characteristics that indicate that the application encrypts network packets (e.g., before transmitting the network packets and/or the like)). As another example, network device A, when selecting the security protocol, may select a security protocol that includes an AH and an encryption algorithm based on the application identifier and one or more characteristics of the application (e.g., one or more characteristics that indicate that the application is a high priority application). As another example, network device A, when selecting the security protocol, may select a security protocol that does not include an AH and includes an encryption algorithm based on the application identifier and one or more characteristics of the application (e.g., one or more characteristics that indicate that the application is a low priority application or a type of application for which authentication is unnecessary). As another example, network device A, when selecting the security protocol, may select a security protocol that does not include an AH and does not include an encryption algorithm based on the application identifier and one or more characteristics of the application (e.g., one or more characteristics that indicate that the application is a low priority application or a type of application for which security is unnecessary). By using information, in addition to the application identifier, to select the security protocol, network device A may increase the granularity to which particular security protocols are applied, which may improve network operations.

In some implementations, network device A may select the security protocol based on the application identifier and at least one of a DSCP of the network packet, L3 information of the network packet (e.g., the IP header), or L4 information of the network packet (e.g., the TCP header). For example, network device A may select the security protocol based on the application identifier and the DSCP of the network packet. As another example, network device A may select the security protocol based on the application identifier, the DSCP of the network packet, and L3 information of the network packet. As another example, network device A may select the security protocol based on the application identifier, the DSCP of the network packet, and L4 information of the network packet. As another example, network device A may select the security protocol based on the application identifier, the DSCP of the network packet, and L3 and L4 information of the network packet. As another example, network device A may select the security protocol based on the application identifier and L3 and/or L4 information of the network packet. By using information, in addition to the application identifier, to select the security protocol, network device A may increase the granularity to which particular security protocols are applied, which may improve network operations.

In some implementations, the security protocol may include using an authentication header (AH) to protect one or more network packets of the plurality of network packets of the packet flow. For example, network device A, when applying the AH, may use a hash function and/or an authentication algorithm. In some implementations, a cryptographic strength of the hash function and/or the authentication algorithm is based on the application identifier. For example, network device A may select a security protocol including an AH that uses a cryptographically stronger hash function for network packets associated with a first application identifier than for network packets associated with a second application identifier. In some implementations, a cryptographic strength of the hash function and/or the authentication algorithm, for a network packet, is based on the application identifier, one or more characteristics of the application associated with the application identifier, the DSCP of the network packet, L3 information of the network packet, and/or L4 information of the network packet. In some implementations, network device A may use the hash function and/or the authentication algorithm to generate the AH for the one or more network packets of the packet flow. In some implementations, the AH may prevent malicious activities, such as replay attacks, unintended accessing of and/or tampering with the contents of the one or more network packets of the packet flow (e.g., the IP header, the TCP header, the data, and/or the like), spoofing, and/or the like, which conserves network resources that would otherwise be used to mitigate damage caused by the malicious activities in the network and/or device resources that would otherwise be used to mitigate damage caused by the malicious activities on a device, such as a source device or a destination device.

In some implementations, the security protocol may include using an encryption algorithm to encrypt the one or more network packets of the packet flow. In some implementations, a cryptographic strength of the encryption algorithm is based on the application identifier. For example, network device A may select a security protocol that uses a cryptographically stronger encryption algorithm for network packets associated with a first application identifier than for network packets associated with a second application identifier. In some implementations, a cryptographic strength of the encryption algorithm, for a network packet, is based on the application identifier, one or more characteristics of the application associated with the application identifier, the DSCP of the network packet, L3 information of the network packet, and/or L4 information of the network packet. In some implementations, network device A may use the encryption algorithm to encrypt the one or more network packets of the packet flow and generate an encapsulating security payload (ESP) header, an ESP trailer, and/or an ESP authentication block for the one or more network packets of the packet flow. In some implementations, the encryption algorithm may prevent malicious activities, such as unintended accessing of and/or tampering with the contents of the one or more network packets of the packet flow (e.g., the IP header, the TCP header, the data, and/or the like), replay attacks, spoofing, and/or the like, which conserves network resources that would otherwise be used to mitigate damage caused by the malicious activities in the network and/or device resources that would otherwise be used to mitigate damage caused by the malicious activities on a device, such as a source device or a destination device.

In some implementations, network device A, when applying the security protocol, may add a UDP header to the one or more network packets of the packet flow, where the UDP header identifies the security protocol applied to the one or more network packets of the packet flow. In some implementations, a network device that receives the packet flow may determine, based on the UDP header, the security protocol applied to the one or more network packets of the packet flow and may, based on the security protocol, determine, for example, the AH and/or the encryption algorithm applied to the one or more network packets of the packet flow.

As shown in FIG. 1A, and by reference number 115, network device A may apply the security protocol to the one or more network packets of the packet flow to generate protected network packets. In some implementations, network device A may apply the security protocol to the one or more network packets of the packet flow by applying an AH to generate the protected network packets. For example, network device A may insert the AH into the one or more network packets of the packet flow to generate the protected network packets.

In some implementations, network device A may apply the security protocol to the one or more network packets of the packet flow by encrypting the one or more network packets of the packet flow to generate the protected network packets. For example, network device A may use the encryption algorithm to encrypt the one or more network packets of the packet flow and insert the ESP header, the ESP trailer, and/or the ESP authentication block into the one or more network packets of the packet flow to generate the protected network packets.

In some implementations, network device A may apply the security protocol to the one or more network packets of the packet flow and add a UDP header to the one or more network packets of the packet flow when generating the protected network packets. For example, network device A may prepend the UDP header to the one or more network packets of the packet flow when generating the protected network packets.

In some implementations, network device A may apply the security protocol to the one or more network packets of the packet flow by encrypting the one or more network packets of the packet flow to generate one or more encrypted network packets and then applying an AH to the one or more encrypted network packets to generate the protected network packets. For example, network device A may encrypt the one or more network packets of the packet flow and insert an ESP header, the ESP trailer, and/or the ESP authentication block into the one or more network packets of the packet flow to generate the one or more encrypted network packets and then insert an AH into the one or more encrypted network packets to generate the protected network packets.

Additionally, or alternatively, network device A may apply the security protocol to the one or more network packets of the packet flow by encrypting the one or more network packets of the packet flow to generate one or more encrypted network packets and then applying a UDP header to the one or more encrypted network packets to generate the protected network packets. For example, network device A may encrypt the one or more network packets of the packet flow and insert an ESP header, the ESP trailer, and/or the ESP authentication block to generate the one or more encrypted network packets and then prepend a UDP header to the one or more encrypted network packets to generate the protected network packets.

As shown in FIG. 1A, and by reference number 120, network device A may transmit the protected network packets via the network. In some implementations, network device A may transmit the protected network packets via an IPsec tunnel in the network. For example, network device A may transmit the protected network packets through an IPsec tunnel by applying a new IP header to the protected network packets that is different from an original IP header of the network packets, such that the new IP header transmits the protected network packets from network device A through an IPsec tunnel to another network device, which then transmits the network packets based on the original IP header.

Additionally, or alternatively, network device A may select, based on application identifiers for a plurality of applications, security protocols to transmit network packets from each application of the plurality of applications through different IPsec tunnels. For example, a first security protocol for a first application identifier may include applying a first IP header to first network packets from a first application to transmit the first network packets through a first IPsec tunnel (e.g., from network device A to a first network device and/or the like), and a second security protocol for a second application identifier may include applying a second IP header to second network packets from a second application to route the second network packets through a second IPsec tunnel (e.g., from network device A to a second network device and/or the like). In this way, the security protocols selected by network device A may designate, for each application, an IPsec tunnel for the transmission of network packets of the application.

In some implementations, network device A may transmit the protected network packets via IPsec transport mode over the network. For example, network device A may transmit the protected network packets via IPsec transport mode by applying the original IP header of the network packets to the protected network packets. In some implementations, network device A may apply the original IP header of the network packets to the protected network packets and include information regarding the security protocol applied to the protected network packets (e.g., whether an AH has been applied, whether the network packets have been encrypted, and/or the like).

In some implementations, network device A may transmit the protected network packets via a Group Encrypted Transport VPN (Group VPN). For example, network device A may be a group member of a Group VPN including multiple group members, where the group members share a common security association that may include security protocols, such as AHs, encryption algorithms, and/or the like. In some implementations, network device A may apply the original IP header of the network packets to the protected network packets and transmit, via the Group VPN, the protected network packets with the original IP header applied. In this way, a group member receiving the protected network packets with the original IP header applied may use the common security association to, for example, decrypt the protected network packets.

In this way, network device A may receive the plurality of network packets of the packet flow, select, based on the application identifier associated with the plurality of network packets, the security protocol, apply the security protocol to the one or more network packets of the packet flow to generate the protected network packets, and transmit, via the network, the protected network packets. By selecting the security protocol that is appropriate for the application sending the plurality of network packets, network device A may apply an appropriate level of security to one or more network packets of the packet flow, which may improve network operations by conserving computing resources that would otherwise have been consumed by applying an inappropriate level of security to the one or more network packets of the packet flow.

In the example implementation(s) 100 as shown in FIG. 1A and described above, network device A, may select, based on the application identifier associated with the plurality of network packets of the packet flow, a security protocol that may include applying an AH to one or more network packets of the packet flow, using an encryption algorithm to encrypt one or more network packets of the packet flow, applying a UDP header to one or more network packets of the packet flow, and/or the like to generate protected network packets. The example implementation(s) 100 as shown in FIG. 1B and described below may include network device A selecting a security protocol that includes encrypting the one or more network packets and applying a UDP header to generate UDP packets.

As shown in FIG. 1B, and by reference number 125, an application on a source device may provide, to network device A, a packet flow including a plurality of network packets, as described with respect to FIG. 1A. For example, a network packet, of the plurality of network packets, may include an IP header, a transmission control protocol (TCP) header, and data. In some implementations, network device A may identify an application identifier of a network packet of the plurality of network packets, as described with respect to FIG. 1A.

In some implementations, before network device A has identified the application identifier of the network packet as described herein, network device A may apply a particular AH (e.g., a default AH) and/or a particular encryption algorithm (e.g., a default encryption algorithm) to a first group of network packets of the packet flow to generate first protected network packets, and may transmit the first protected network packets, as described herein with respect to FIG. 1A.

In some implementations, after network device A has identified the application identifier of the network packet (e.g., using deep packet inspection), network device A may select, based on the application identifier, a security protocol to be applied to one or more network packets of the plurality of network packets of the packet flow, as shown in FIG. 1B, and by reference number 130. For example, network device A may select, based on the application identifier, a security protocol that includes inserting an ESP header, an ESP trailer, and/or an ESP authentication block into the one or more network packets of the packet flow, encrypting the one or more network packets of the packet flow, and applying a UDP header to the one or more network packets of the packet flow. In some implementations, the UDP header may identify the security protocol to be applied to the one or more network packets of the packet flow, as described herein with respect to FIG. 1A.

As shown in FIG. 1B, and by reference number 135, network device A may, generate and insert the ESP header, the ESP trailer, and/or the ESP authentication block into the one or more network packets of the packet flow to generate ESP packets, as described herein with respect to FIG. 1A.

As shown in FIG. 1B, and by reference number 140, network device A may encrypt the ESP packets to generate encrypted ESP packets. For example, network device A may encrypt the IP header, the TCP header, the data, and/or the ESP trailer to generate the encrypted ESP packets, as described herein with respect to FIG. 1A.

As shown in FIG. 1B, and by reference number 145, network device A may apply a UDP header to the encrypted ESP packets to generate UDP packets. For example, network device A may insert the UDP header before the ESP header of the encrypted ESP packets to generate the UDP packets.

As shown in FIG. 1B, and by reference number 150, network device A may transmit the UDP packets to network device B via the network, via an IPsec tunnel, via IPsec transport mode, via a Group VPN, and/or the like, as described herein with respect to network device A transmitting the protected network packets in FIG. 1A.

As shown in FIG. 1C, and by reference number 155, network device B may receive the UDP packets from network device A via the network. For example, network device B may receive the UDP packets via the IPsec tunnel established between network device A and network device B. As another example, network device B may receive the UDP packets via IPsec transport mode. As another example, network device B may receive the UDP packets via the Group VPN.

As shown in FIG. 1C, and by reference number 160, network device B may identify, based on the UDP header, the security protocol applied to the one or more network packets of the packet flow and may, based on the security protocol, determine the authentication algorithm and/or the encryption algorithm applied to the one or more network packets of the packet flow. In some implementations, network device B may identify that the application on the source device provided the one or more network packets within the UDP packets. For example, network device B may identify the security protocol corresponding to the UDP header, the application identifier corresponding to the security protocol, and the application corresponding to the application identifier. As further shown in FIG. 1C, and by reference number 165, network device B may remove the UDP headers or otherwise obtain the encrypted ESP packets from the UDP packets.

As shown in FIG. 1C, and by reference number 170, network device B may decrypt the encrypted ESP packets to obtain the ESP packets. For example, network device B may decrypt, based on the security protocol corresponding to the UDP header, the encrypted ESP packets to obtain the ESP packets. In some implementations, network device B may decrypt the encrypted ESP packets using a decryption algorithm corresponding to the encryption algorithm designated by the security protocol to obtain the ESP packets.

As shown in FIG. 1C, and by reference number 175, network device B may remove the ESP header, the ESP trailer, and/or the ESP authentication block to obtain the one or more network packets of the packet flow. For example, network device B may remove the ESP authentication block from the end of the ESP packets, remove the ESP header from the beginning of the ESP packets, and remove the ESP trailer from the end of the remaining portion of the ESP packets to obtain the one or more network packets of the packet flow.

As shown in FIG. 1C, and by reference number 180, network device B may transmit the plurality of network packets of the packet flow toward the destination device. For example, network device B may, based on the IP header, identify the destination device from among the destination devices, and may transmit the plurality of network packets of the packet flow to the destination device.

By selecting the security protocol that is appropriate for the application sending the plurality of network packets, network device A may apply an appropriate level of security to one or more network packets of the packet flow, which may improve network operations by conserving computing resources that would otherwise have been consumed by applying an inappropriate level of security to the one or more network packets of the packet flow.

As indicated above, FIGS. 1A-1C are provided merely as one or more examples. Other examples may differ from what is described with regard to FIGS. 1A-1C. For example, although FIGS. 1A-1C describe example implementations in which network device A selects a security protocol that includes applying a UDP header to the network packet, other example implementations may include network device A selecting a security protocol that includes applying, to the network packet, a multi-protocol label switching (MPLS) label, a DNS name, a non-IP-based selector, a non-port-based selector, and/or the like. In some implementations, when network device B receives the network packet, network device B may identify the security protocol based on the UDP header, the MPLS label, the DNS name, and/or the like applied by network device A.

Figure 2:
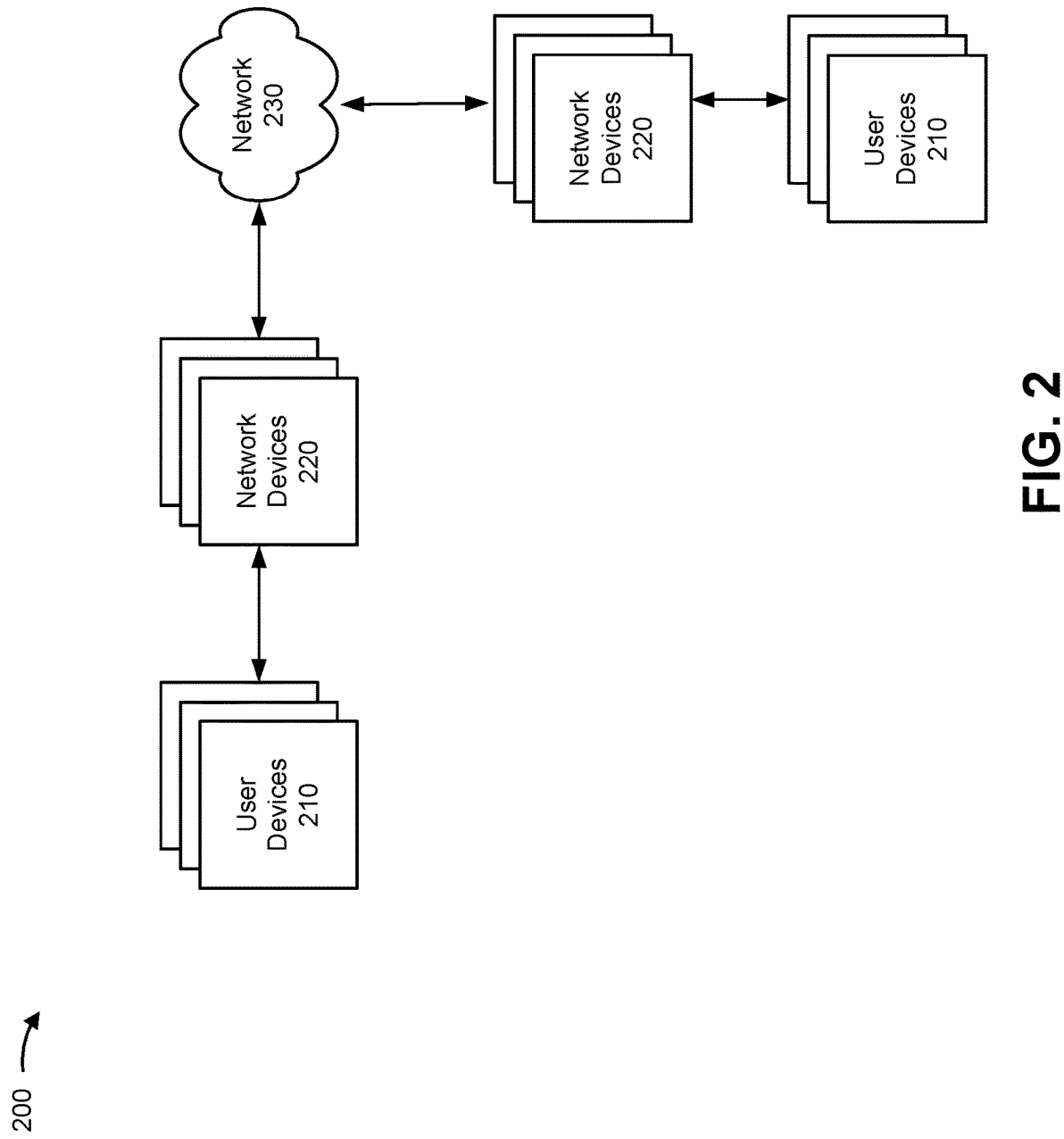
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more user devices 210, one or more network devices 220, and a network 230. Devices of environment 200 may interconnect via wired connections, wireless connections, or a combination of wired and wireless connections.

User device 210 includes one or more devices capable of receiving, generating, storing, processing, and/or providing information associated with network packets. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a personal computer, a server computer, or a similar type of device. User device 210 may include a variety of applications, such as a web browsing application, entertainment application, communications application, gaming application, augmented reality application, and/or the like, for generating network packets to be transmitted to and/or received from other user devices 210 via a network (such as network 230).

Network device 220 includes one or more devices capable of receiving, generating, storing, processing, and/or providing information related to network packets. For example, network device 220 may include a firewall, a router, a gateway, a switch, a hub, a bridge, a reverse proxy, a server (e.g., a proxy server), a security device, an intrusion detection device, a load balancer, and/or a similar device. In some implementations, network device 220 may perform various actions and/or processes on network packets, including encryption, decryption, load balancing, security scanning, and/or the like. In some implementations, network device 220 may be a physical device implemented within a housing, such as a chassis. In some implementations, network device 220 may be a virtual device implemented by one or more computer devices of a cloud computing environment and/or a data center. Although FIG. 2 shows a single network device 220, in practice, there may be hundreds, thousands, millions, and/or the like of network devices 220.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
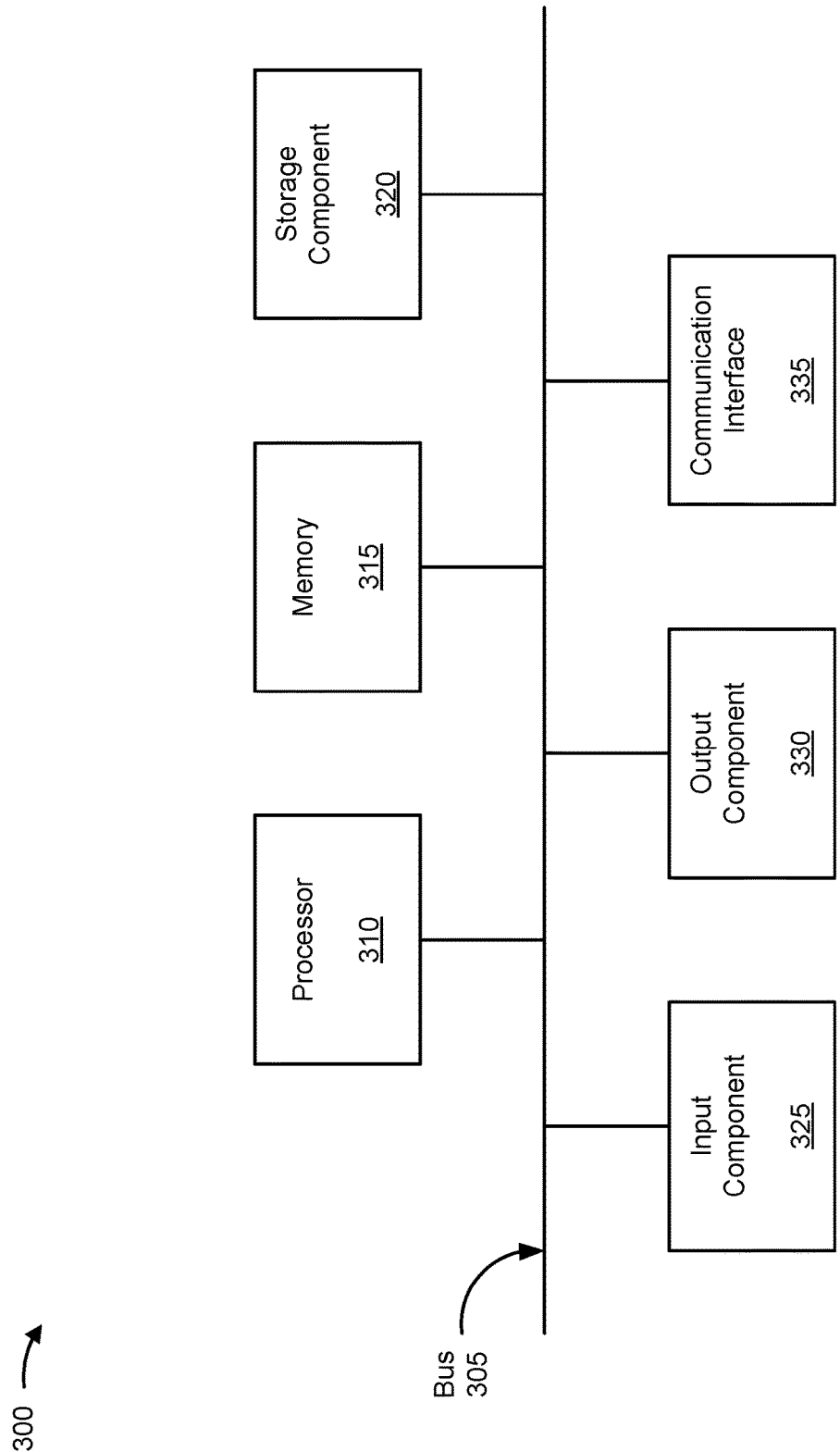
FIGS. 3A and 3B are diagrams of example components of one or more devices of FIG. 2.
Figure 3B:
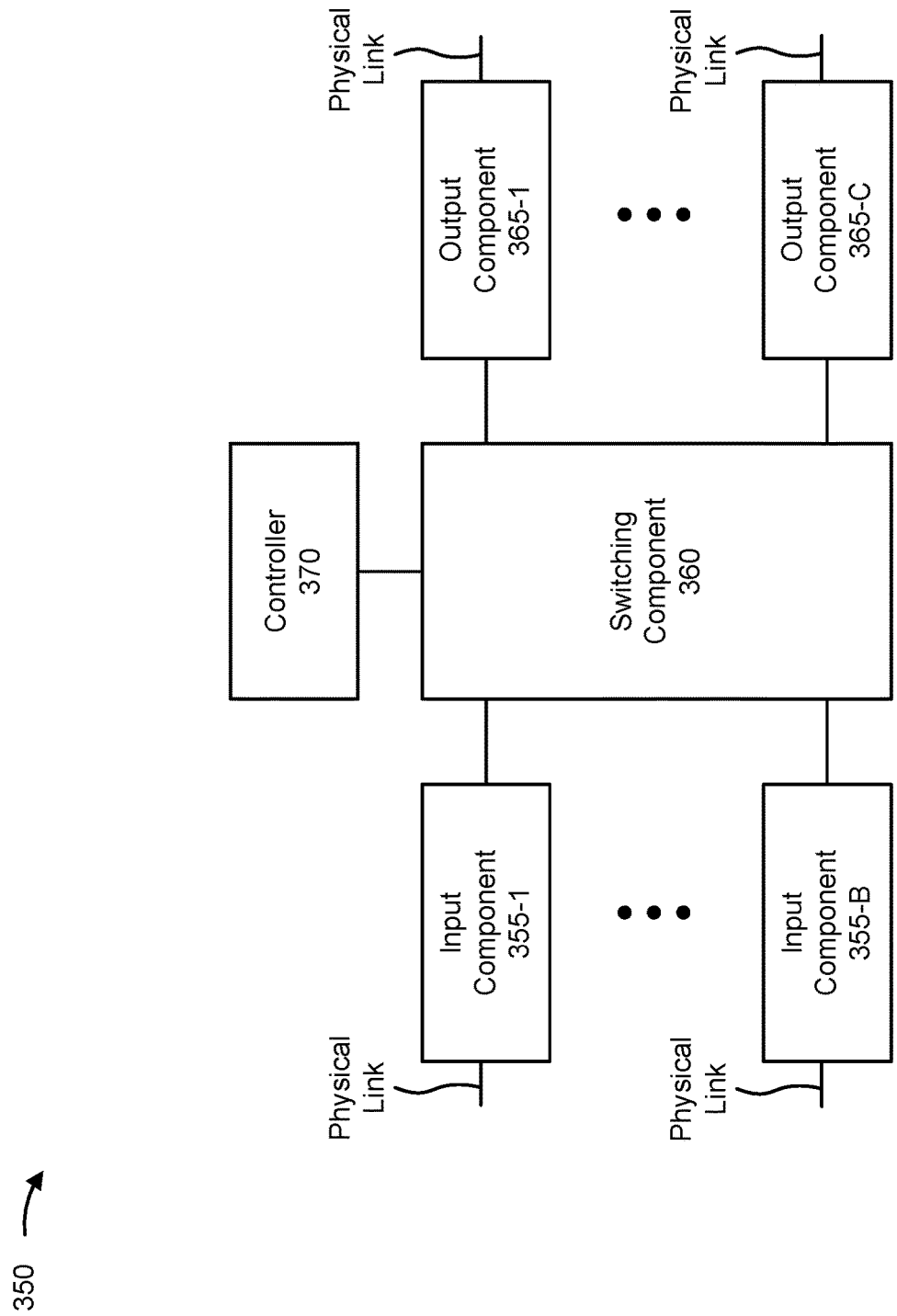

FIGS. 3A and 3B are diagrams of example components of one or more devices of FIG. 2. FIG. 3A is a diagram of example components of a device 300. Device 300 may correspond to user devices 210 and/or network devices 220. In some implementations, user devices 210 and/or network devices 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 220 and/or the like. In some implementations, network device 220 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
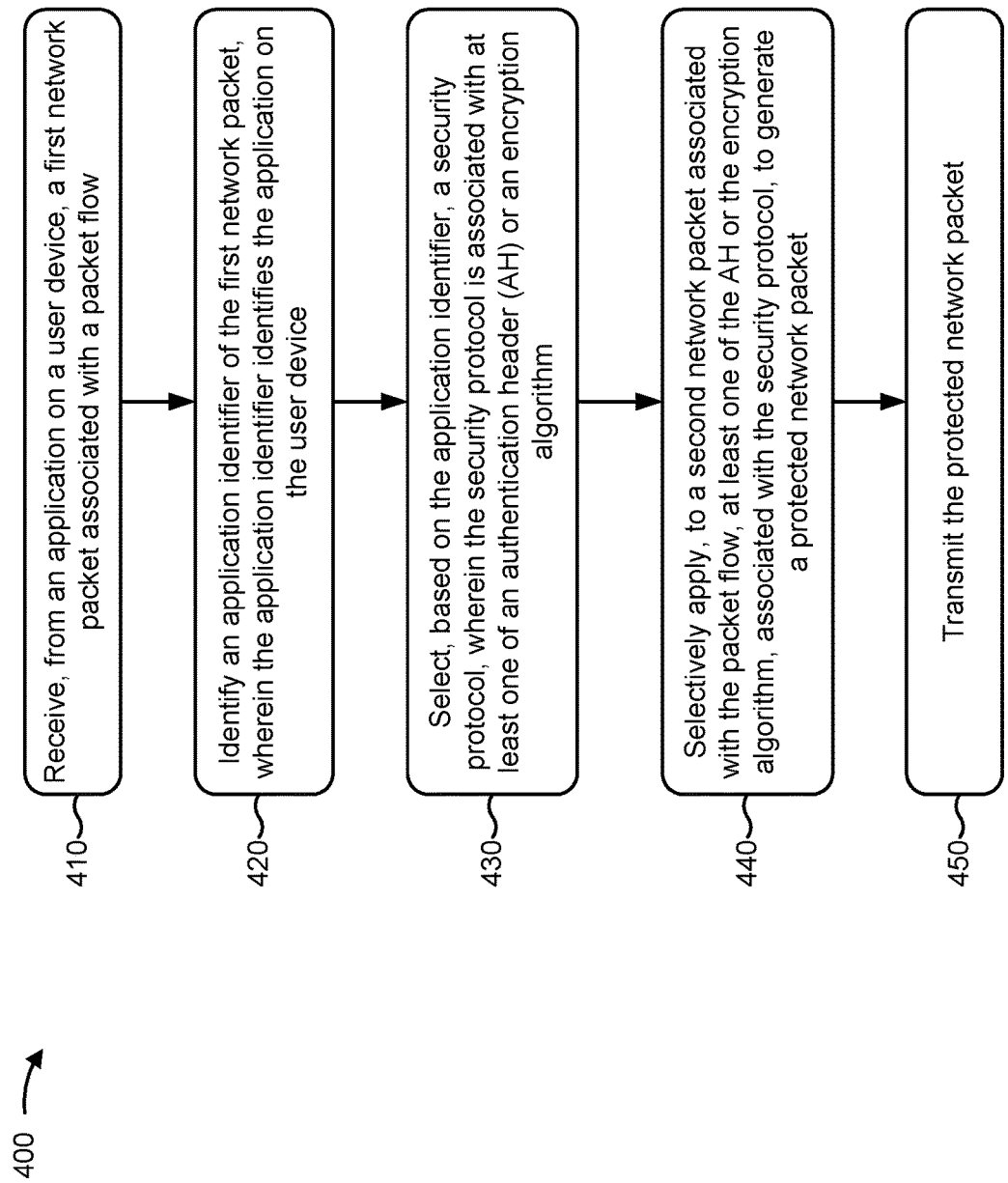
FIGS. 4-6 are flowcharts of example processes for selecting and applying a security protocol to a network packet.

FIG. 4 is a flow chart of an example process 400 for selecting and applying a security protocol to a network packet. In some implementations, one or more process blocks of FIG. 4 may be performed by a network device (e.g., network device 220). In some implementations, one or more process blocks of FIG. 4 may be performed by another device or a group of devices separate from or including the network device, such as a user device (e.g., user device 210) and/or the like.

As shown in FIG. 4, process 400 may include receiving, from an application on a user device, a first network packet associated with a packet flow (block 410). For example, the network device (e.g., using processor 310, input component 325, communication interface 335, input component 355, switching component 360, controller 370, and/or the like) may receive, from an application on a user device, a first network packet associated with a packet flow, as described above.

As further shown in FIG. 4, process 400 may include identifying an application identifier of the first network packet, wherein the application identifier identifies the application on the user device (block 420). For example, the network device (e.g., using processor 310, input component 325, communication interface 335, input component 355, switching component 360, controller 370, and/or the like) may identify an application identifier of the first network packet, as described above. In some implementations, the application identifier identifies the application on the user device.

As further shown in FIG. 4, process 400 may include selecting, based on the application identifier, a security protocol, wherein the security protocol is associated with at least one of an authentication header (AH) or an encryption algorithm (block 430). For example, the network device (e.g., using processor 310, input component 325, communication interface 335, input component 355, switching component 360, controller 370, and/or the like) may select, based on the application identifier, a security protocol, as described above. In some implementations, the security protocol is associated with at least one of an authentication header (AH) or an encryption algorithm.

As further shown in FIG. 4, process 400 may include selectively applying, to a second network packet associated with the packet flow, at least one of the AH or the encryption algorithm, associated with the security protocol, to generate a protected network packet (block 440). For example, the network device (e.g., using processor 310, input component 325, communication interface 335, input component 355, switching component 360, controller 370, and/or the like) may apply to a second network packet associated with the packet flow, at least one of the AH or the encryption algorithm, associated with the security protocol, to generate a protected network packet, as described above.

As further shown in FIG. 4, process 400 may include transmitting the protected network packet (block 450). For example, the network device (e.g., using processor 310, input component 325, communication interface 335, input component 355, switching component 360, controller 370, and/or the like) may transmit the protected network packet, as described above.

Process 400 may include additional implementations, such as any single implementation or any combination of implementations described below and/or in connection with one or more other processes described elsewhere herein.

In a first implementation, selecting the security protocol comprises selecting the security protocol based on the application identifier and one or more rules, wherein the one or more rules identify AHs and/or encryption algorithms to be applied for a plurality of application identifiers that include the application identifier.

In a second implementation, alone or in combination with the first implementation, the one or more rules identify AHs and/or encryption algorithms to be applied for groups of application identifiers, and the groups of application identifiers are based on characteristics of applications identified by the plurality of application identifiers.

In a third implementation, alone or in combination with one or more of the first and second implementations, applying the security protocol to generate the protected network packet comprises inserting at least one of an encapsulating security payload header, an AH, or a user datagram protocol header into the second network packet.

In a fourth implementation, alone or in combination with one or more of the first through third implementations, selecting the security protocol comprises selecting the security protocol based on the application identifier and at least one of a differentiated services code point of the first network packet, layer 3 information of the first network packet, or layer 4 information of the first network packet.

In a fifth implementation, alone or in combination with one or more of the first through fourth implementations, selecting the security protocol comprises selecting at least one of an AH or an encryption algorithm based on the application identifier and one or more characteristics of the application.

In a sixth implementation, alone or in combination with one or more of the first through fifth implementations, the application is designed to encrypt network packets of the packet flow, and the security protocol includes an AH and does not include an encryption algorithm.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
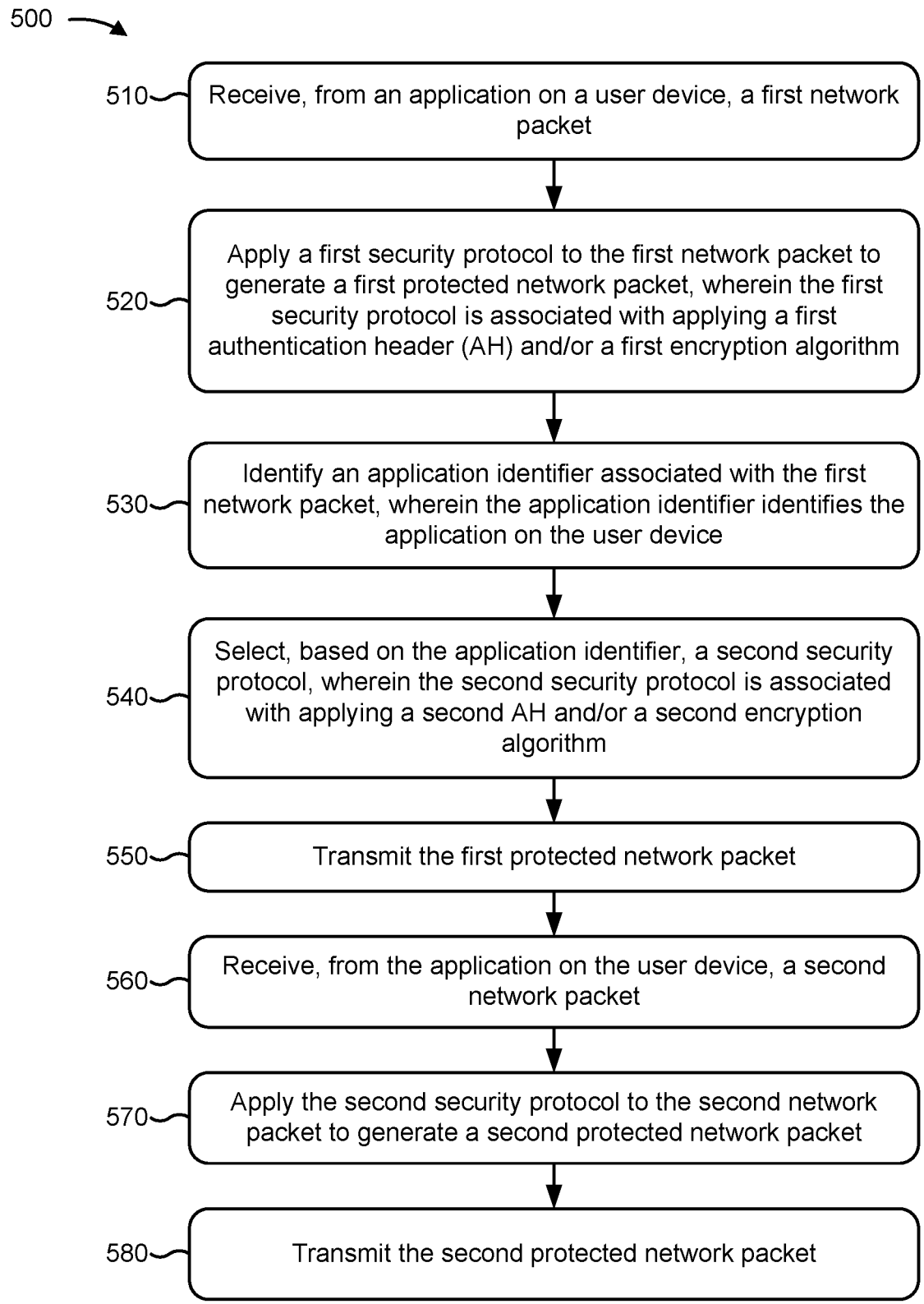

FIG. 5 is a flow chart of an example process 500 for selecting and applying a security protocol to a network packet. In some implementations, one or more process blocks of FIG. 5 may be performed by a network device (e.g., network device 220). In some implementations, one or more process blocks of FIG. 5 may be performed by another device or a group of devices separate from or including the network device, such as a user device (e.g., user device 210) and/or the like.

As shown in FIG. 5, process 500 may include receiving, from an application on a user device, a first network packet (block 510). For example, the network device (e.g., using processor 310, input component 325, communication interface 335, input component 355, switching component 360, controller 370, and/or the like) may receive, from an application on a user device, a first network packet, as described above.

As further shown in FIG. 5, process 500 may include applying a first security protocol to the first network packet to generate a first protected network packet, wherein the first security protocol is associated with applying a first authentication header (AH) and/or a first encryption algorithm (block 520). For example, the network device (e.g., using processor 310, input component 325, communication interface 335, input component 355, switching component 360, controller 370, and/or the like) may apply a first security protocol to the first network packet to generate a first protected network packet, as described above. In some implementations, the first security protocol is associated with applying a first authentication header (AH) and/or a first encryption algorithm.

As further shown in FIG. 5, process 500 may include identifying an application identifier associated with the first network packet, wherein the application identifier identifies the application on the user device (block 530). For example, the network device (e.g., using processor 310, input component 325, communication interface 335, input component 355, switching component 360, controller 370, and/or the like) may identify an application identifier associated with the first network packet, as described above. In some implementations, the application identifier identifies the application on the user device.

As further shown in FIG. 5, process 500 may include selecting, based on the application identifier, a second security protocol, wherein the second security protocol is associated with applying a second AH and/or a second encryption algorithm (block 540). For example, the network device (e.g., using processor 310, input component 325, communication interface 335, input component 355, switching component 360, controller 370, and/or the like) may select, based on the application identifier, a second security protocol, as described above. In some implementations, the second security protocol is associated with applying a second AH and/or a second encryption algorithm.

As further shown in FIG. 5, process 500 may include transmitting the first protected network packet (block 550). For example, the network device (e.g., using processor 310, input component 325, communication interface 335, input component 355, switching component 360, controller 370, and/or the like) may transmit the first protected network packet, as described above.

As further shown in FIG. 5, process 500 may include receiving, from the application on the user device, a second network packet (block 560). For example, the network device (e.g., using processor 310, input component 325, communication interface 335, input component 355, switching component 360, controller 370, and/or the like) may receive, from the application on the user device, a second network packet, as described above.

As further shown in FIG. 5, process 500 may include applying the second security protocol to the second network packet to generate a second protected network packet (block 570). For example, the network device (e.g., using processor 310, input component 325, communication interface 335, input component 355, switching component 360, controller 370, and/or the like) may apply the second security protocol to the second network packet to generate a second protected network packet, as described above.

As further shown in FIG. 5, process 500 may include transmitting the second protected network packet (block 580). For example, the network device (e.g., using processor 310, input component 325, communication interface 335, input component 355, switching component 360, controller 370, and/or the like) may transmit the second protected network packet, as described above.

Process 500 may include additional implementations, such as any single implementation or any combination of implementations described below and/or in connection with one or more other processes described elsewhere herein.

In a first implementation, process 500 includes, when selecting the second security protocol, selecting the second security protocol based on the application identifier and one or more rules, wherein the one or more rules identify AHs and/or encryption algorithms to be applied for a plurality of application identifiers that include the application identifier.

In a second implementation, alone or in combination with the first implementation, the one or more rules identify AHs and/or encryption algorithms to be applied for groups of application identifiers, and the groups of application identifiers are based on characteristics of applications identified by the plurality of application identifiers.

In a third implementation, alone or in combination with one or more of the first and second implementations, process 500 includes, when selecting the second security protocol, selecting the second security protocol based on the application identifier and at least one of a differentiated services code point of the first network packets, layer 3 information of the first network packets, or layer 4 information of the first network packets.

In a fourth implementation, alone or in combination with one or more of the first through third implementations, process 500 includes selecting at least one of a second AH or a second encryption algorithm based on the application identifier and one or more characteristics of the application.

In a fifth implementation, alone or in combination with one or more of the first through fourth implementations, the application is designed to encrypt the first network packet and the second network packet, and the second security protocol includes a second AH and does not include a second encryption algorithm.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
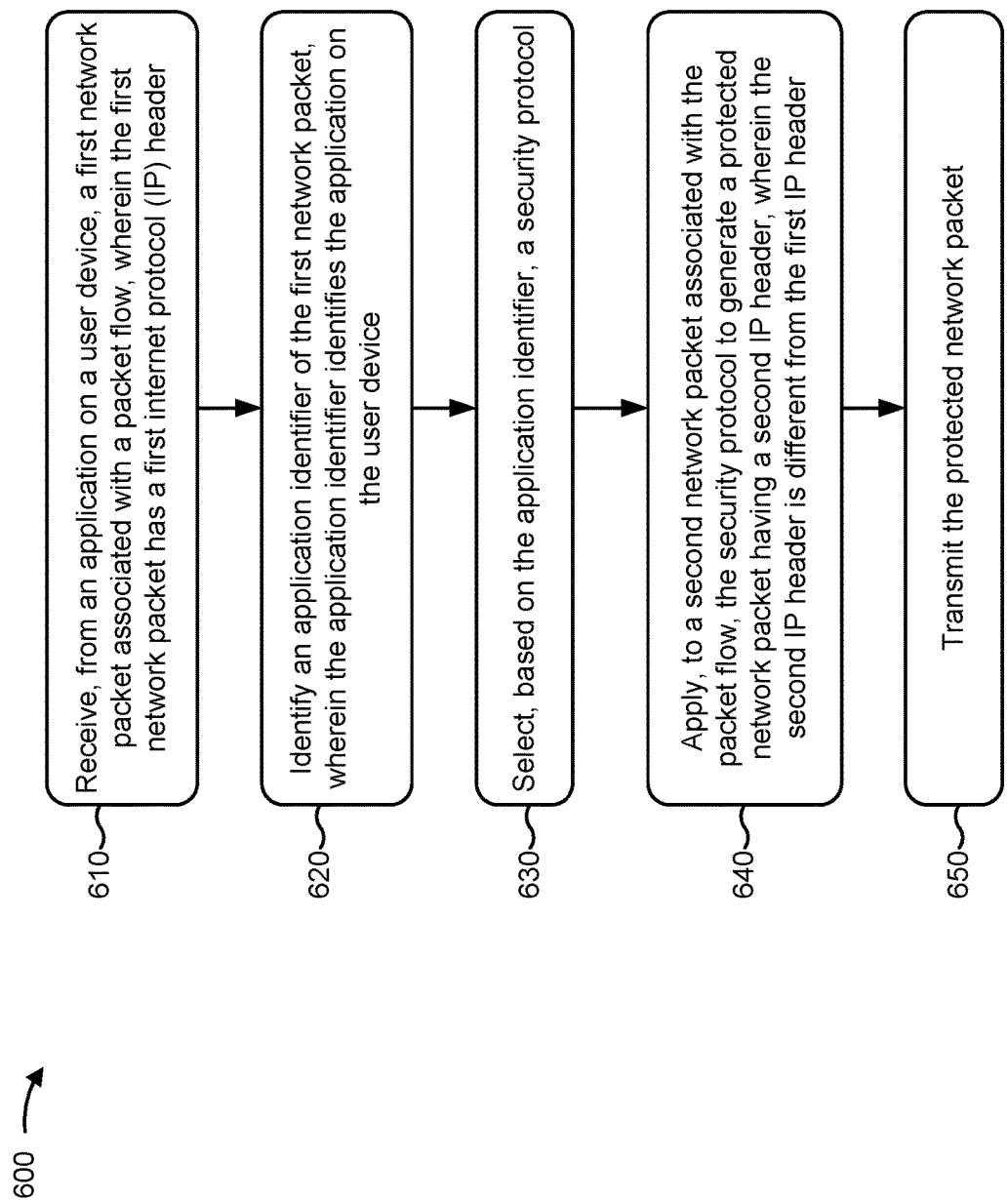

FIG. 6 is a flow chart of an example process 600 for selecting and applying a security protocol to a network packet. In some implementations, one or more process blocks of FIG. 6 may be performed by a network device (e.g., network device 220). In some implementations, one or more process blocks of FIG. 6 may be performed by another device or a group of devices separate from or including the network device, such as a user device (e.g., user device 210) and/or the like.

As shown in FIG. 6, process 600 may include receiving, from an application on a user device, a first network packet associated with a packet flow, wherein the first network packet has a first internet protocol (IP) header (block 610). For example, the network device (e.g., using processor 310, input component 325, communication interface 335, input component 355, switching component 360, controller 370, and/or the like) may receive, from an application on a user device, a first network packet associated with a packet flow, as described above. In some implementations, the first network packet has a first internet protocol (IP) header.

As further shown in FIG. 6, process 600 may include identifying an application identifier of the first network packet, wherein the application identifier identifies the application on the user device (block 620). For example, the network device (e.g., using processor 310, input component 325, communication interface 335, input component 355, switching component 360, controller 370, and/or the like) may identify an application identifier of the first network packet, as described above. In some implementations, the application identifier identifies the application on the user device.

As further shown in FIG. 6, process 600 may include selecting, based on the application identifier, a security protocol (block 630). For example, the network device (e.g., using processor 310, input component 325, communication interface 335, input component 355, switching component 360, controller 370, and/or the like) may select, based on the application identifier, a security protocol, as described above.

As further shown in FIG. 6, process 600 may include applying, to a second network packet associated with the packet flow, the security protocol to generate a protected network packet having a second IP header, wherein the second IP header is different from the first IP header (block 640). For example, the network device (e.g., using processor 310, input component 325, communication interface 335, input component 355, switching component 360, controller 370, and/or the like) may apply, to a second network packet associated with the packet flow, the security protocol to generate a protected network packet having a second IP header, as described above. In some implementations, the second IP header is different from the first IP header.

As further shown in FIG. 6, process 600 may include transmitting the protected network packet (block 650). For example, the network device (e.g., using processor 310, input component 325, communication interface 335, input component 355, switching component 360, controller 370, and/or the like) may transmit the protected network packet, as described above.

Process 600 may include additional implementations, such as any single implementation or any combination of implementations described below and/or in connection with one or more other processes described elsewhere herein.

In a first implementation, process 600 includes selecting the security protocol based on the application identifier and one or more rules, wherein the one or more rules identify authentication headers and/or encryption algorithms to be applied for a plurality of application identifiers.

In a second implementation, alone or in combination with the first implementation, the one or more rules identify authentication headers and/or encryption algorithms to be applied for groups of application identifiers, and the groups of application identifiers are based on characteristics of applications identified by the plurality of application identifiers.

In a third implementation, alone or in combination with one or more of the first and second implementations, process 600 includes, when applying the security protocol to generate the protected network packet, inserting at least one of an encapsulating security payload header, an authentication header, or a user datagram protocol header between the first IP header and the second IP header.

In a fourth implementation, alone or in combination with one or more of the first through third implementations, process 600 includes, when selecting the security protocol, selecting the security protocol based on the application identifier and at least one of a differentiated services code point of the first network packet, layer 3 information of the first network packet, or layer 4 information of the first network packet.

In a fifth implementation, alone or in combination with one or more of the first through fourth implementations, process 600 includes, when selecting the security protocol, selecting at least one of an authentication header or an encryption algorithm based on the application identifier and one or more characteristics of the application.

In a sixth implementation, alone or in combination with one or more of the first through fifth implementations, the application is designed to encrypt the packet flow, and the security protocol includes an authentication header and does not include an encryption algorithm.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a network device, an application identifier of a first network packet associated with a packet flow, wherein the application identifier identifies an application on a user device;
selecting, by the network device and based on the application identifier and a priority level of the application, a security protocol,
wherein the security protocol associated with at least one of an authentication header (AH) or an encryption algorithm;
selectively applying, by the network device and to a second network packet associated with the packet flow, at least one of the AH or the encryption algorithm associated with the security protocol, to generate a protected network packet; and
transmitting, by the network device, the protected network packet.

2. The method of claim 1, wherein the priority level of the application is high priority when the application is business critical and a low priority when the application is not business critical.

3. The method of claim 2, wherein selecting the security protocol comprises:
selecting the security protocol with the AH and the encryption algorithm when the priory level of the application is higher than a threshold priority.

4. The method of claim 1, wherein selecting the security protocol comprises:
selecting the security protocol that does not include the AH when the priority level is lower than a priority threshold.

5. The method of claim 1, wherein selecting the security protocol comprises:
selecting the security protocol that does not include the encryption algorithm when the priority level is lower than a priority threshold.

6. The method of claim 1, wherein selecting the security protocol comprises:
selecting a granularity level of the security protocol based on the priority level of the application.

7. The method of claim 1, wherein applying the security protocol to generate the protected network packet comprises:
inserting at least one of an encapsulating security payload header or a user datagram protocol header into the second network packet.

8. A device comprising:
one or more memories;
one or more processors to:
identify an application identifier of a first network packet associated with a packet flow, wherein the application identifier identifies an application on a user device;
select, based on the application identifier and a priority level of the application, a security protocol;
selectively apply, to a second network packet associated with the packet flow, the security protocol, to generate a protected network packet; and
transmit the protected network packet.

9. The device of claim 8, wherein the one or more processors, to select the security protocol, are to:
select the security protocol based on a type of the application.

10. The device of claim 8, wherein the one or more processors, to select the security protocol, are to:
select the security protocol based on whether the application includes inherent encryption.

11. The device of claim 8, wherein the one or more processors, to select the security protocol, are to:
select the security protocol with an authentication header (AH), the AH using a hash function and a cryptographic strength of the hash function is based on the priority level of the application.

12. The device of claim 8, wherein the one or more processors, to select the security protocol, are to:
select the security protocol based on the security protocol being associated with an encryption algorithm,
the encryption algorithm being used to encrypt one of:
a transmission control protocol (TCP) header,
an internet protocol (IP) header, or
an encapsulating security payload (ESP) trailer.

13. The device of claim 8, wherein the one or more processors, to select the security protocol, are to:
insert at least one of an encapsulating security payload header or a user datagram protocol header into the second network packet.

14. The device of claim 8, wherein the one or more processors, to identify the application identifier associated with the first network packet, cause the one or more processors to:
use deep packet inspection to identify the application identifier for the application.

15. A non-transitory computer-readable medium storing instructions, the instructions comprising:
one or more instructions that, when executed by one or more processors, cause the one or more processors to:
receive, from an application on a user device, a first network packet;
apply a first security protocol to the first network packet to generate a first protected network packet,
wherein the first security protocol is associated with applying one or more of a first authentication header (AH) or a first encryption algorithm;

identify an application identifier associated with the first network packet, wherein the application identifier identifies the application on the user device;

select, based on the application identifier and priority level of the application, a second security protocol, wherein the second security protocol is associated with applying at least one of a second AH or a second encryption algorithm;

transmit the first protected network packet;

receive, from the application on the user device, a second network packet;

apply the second security protocol to the second network packet to generate a second protected network packet; and transmit the second protected network packet.

16. The non-transitory computer-readable medium of claim 15, wherein the one or more instructions, that cause the one or more processors apply the first security protocol, cause the one or more processors to:

apply the first security protocol to the first network packet the first security protocol including the first encryption algorithm being used to encrypt one of:
 a transmission control protocol (TCP) header,
 an internet protocol (IP) header, or
 an encapsulating security payload (ESP) trailer.

17. The non-transitory computer-readable medium of claim 15, wherein the one or more instructions, that cause the one or more processors to select the second security protocol, cause the one or more processors to:

select the second security protocol with the second AH, the second AH using a hash function and a cryptographic strength of the hash function is based on the priority level of the application.

18. The non-transitory computer-readable medium of claim 15, wherein the one or more instructions, that cause the one or more processors to select the security protocol, cause the one or more processors to:

select the security protocol based on the application identifier and at least one of a differentiated services code point of the first network packet, layer 3 information of the first network packet, or layer 4 information of the first network packet.

19. The non-transitory computer-readable medium of claim 15, wherein the one or more instructions, that cause the one or more processors to identify the application identifier associated with the first network packet, cause the one or more processors to:

use deep packet inspection to identify the application identifier for the application.

20. The non-transitory computer-readable medium of claim 15, wherein the one or more instructions, that cause the one or more processors to select the second security protocol, cause the one or more processors to:

select a granularity level of the second security protocol based on the priority level of the application.

\* \* \* \* \*